United States Patent
Aeberhard et al.

(10) Patent No.: US 11,455,736 B2
(45) Date of Patent: Sep. 27, 2022

(54) OBJECT TRACKING BASED ON MULTIPLE MEASUREMENT HYPOTHESES

(71) Applicant: Bayerische Motoren Werke Aktiengesellschaft, Munich (DE)

(72) Inventors: Michael Aeberhard, Munich (DE); Dominik Kellner, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 177 days.

(21) Appl. No.: 17/050,628

(22) PCT Filed: Jul. 6, 2018

(86) PCT No.: PCT/EP2018/068386
§ 371 (c)(1),
(2) Date: Oct. 26, 2020

(87) PCT Pub. No.: WO2020/007487
PCT Pub. Date: Jan. 9, 2020

(65) Prior Publication Data
US 2021/0233261 A1 Jul. 29, 2021

(51) Int. Cl.
*G06T 7/292* (2017.01)
*G06T 7/207* (2017.01)

(52) U.S. Cl.
CPC ............ *G06T 7/292* (2017.01); *G06T 7/207* (2017.01); *G06T 2207/20076* (2013.01)

(58) Field of Classification Search
CPC . G06T 7/292; G06T 2207/20076; G06K 9/62; G06K 17/16
See application file for complete search history.

(56) References Cited

U.S. PATENT DOCUMENTS 5,798,942 A * 8/1998 Danchick .............. G01S 3/7864
342/36

FOREIGN PATENT DOCUMENTS

CN 107677997 A 2/2018

OTHER PUBLICATIONS

Granstrom, K., et al., "Extended Object Tracking: Introduction, Overview and Applications", Feb. 21, 2017, pp. 1-30 (30 pages).
(Continued)

*Primary Examiner* — Myron Wyche
(74) *Attorney, Agent, or Firm* — Crowell & Moring LLP

(57) ABSTRACT

A method and system for integrating multiple measurement hypotheses in an efficient labeled multi-Bernoulli (LMB) filter. The LMB filter estimates a plurality of tracks for a plurality of objects, each track of the plurality of tracks having a unique label, a probability, and a state, wherein each track of the plurality of tracks is associated to an object of a plurality of objects to be tracked, each object having an object state. The method receives one or more measurement hypotheses of the multiple measurement hypotheses for each object of the plurality of objects; updates each track of the plurality of tracks based on the respective track and the one or more measurement hypotheses of the multiple measurement hypotheses; determines, for each combination of track of the plurality of tracks and measurement hypothesis, a likelihood $\eta_z(j, k)$; samples, for each iteration of a plurality of iterations, an update hypothesis $\gamma^{(t)}$, based on an association of each track of the plurality of tracks to one of: a measurement hypothesis, an events missed detection, or a track dying detection; determining the state of each track of the plurality of tracks based on its respective associations in the updated hypotheses $\gamma^{(t)}$; extracts, for each track of the plurality of tracks, an existence probability; predicting the object state of each object of the plurality of objects with (Continued)

respect to a next measurement time; determines, whether another update is to be performed; and if another update is to be performed, repeats again the method steps from and including updating each track of the plurality of tracks.

18 Claims, 2 Drawing Sheets

(56) References Cited

OTHER PUBLICATIONS

Broggi, A. et al., "Multi-Resolution Vehicle Detection Using Artificial Vision,", 2004 IEEE Intelligent Vehicles Symposium, Jun. 14-17, 2004, pp. 310-314, University of Parma (five (5) pages).
Li B., "3D Fully Convolutional Network for Vehicle Detection in Point Cloud", Jan. 16, 2017, (five (5) pages).
Vaquero, V., et al., "Deconvolutional Networks for Point-Cloud Vehicle Detection and Tracking in Driving Scenarios", Aug. 23, 2018 (seven (7) pages).
Kellner D., et al., "Tracking of Extended Objects with High-Resolution Doppler Radar" IEEE Transactions on Intelligent Transportation Systems, Dec. 2015, pp. 1-13 (14 pages).
Vo B., et al., "An Efficient Implementation of the Generalized Labeled Multi-Bernoulli Filter", IEEE Trans. Signal Processing, Apr. 2017, vol. 65, Issue No. 8, pp. 1-12 (12 pages).
International Search Report (PCT/ISA/210) issued in PCT Application No. PCT/EP2018/068386 dated Feb. 26, 2019 (four (4) pages).
Written Opinion (PCT/ISA/237) issued in PCT Application No. PCT/EP2018/068386 dated Feb. 26, 2019 (seven (7) pages).
Beard M. et al., "Multiple Extended Target Tracking With Labeled Random Finite Sets," IEEE Transactions on Signal Processing, Apr. 1, 2016, pp. 1638-1653, vol. 64, Issue No. 7, XP011599922 (16 pages).
Hirscher T. et al., "Multiple Extended Object Tracking Using Gaussian Processes", 19th International Conference on Information Fusion, Jul. 5-8, 2016, pp. 868-875, XP032935102 (eight (8) pages).
Reuter S. et al., "A Fast Implementation of the Labeled Multi-Bernoulli Filter Using Gibbs Sampling", 2017 IEEE Intelligent Vehicles Symposium (IV), Jun. 11-14, 2017, pp. 765-772, XP022133840 (eight (8) pages).

\* cited by examiner

OBJECT TRACKING BASED ON MULTIPLE MEASUREMENT HYPOTHESES

BACKGROUND AND SUMMARY OF THE INVENTION

The present disclosure relates to a method and system for object tracking, in particular for use in object tracking for automotive applications.

The detection and motion estimation of an unknown number of objects, for example traffic participants, in dense, cluttered environments is an essential task for autonomous driving systems. Recent research using Random Finite Sets show promising results and are the state-of-the-art for object tracking.

A major challenge for fully autonomous driving is the detection and interpretation of dynamic objects in the environment. Urban situations in particular offer many challenges with a large number of traffic participants, such as cars, pedestrians and cyclists, which must be reliably detected and their often highly dynamic motion state estimated. A dense urban environment is also more prone to clutter measurements and false detections from sensors due to the presence of many different objects such as buildings, parked cars, traffic signs, trees, etc. Additionally, it is not always possible to extract a single correct measurement hypothesis for each object, resulting in multiple, dependent measurements for a single object.

K. Granstrom, M. Baum, and S. Reuter, "Extended object tracking: Introduction, overview and applications," arXiv preprint arXiv:1604.00970, 2016, describe extended objects that are defined as objects which can produce multiple spatially distributed measurements. A laser scanner point cloud is such an example, where each laser scanner point is modeled as a single measurement and is physically produced by a different part of an object. However, some object detection techniques extract a high-level measurement representation from raw data. For such measurements, multiple hypotheses for a single object may result, where the measurements from a single object are dependent and not spatially distributed. Current tracking applications avoid this problem by selecting the most likely measurement hypothesis for a single object and ignoring the rest.

Two typical examples where multiple measurement hypotheses are produced is with detection algorithms for camera and laser scanner sensors. Image processing techniques for object detection usually produce several detection hypotheses for a single object. A. Broggi, P. Cerri, and P. C. Antonello, "Multi-resolution vehicle detection using artificial vision," in Intelligent Vehicles Symposium, 2004 IEEE. IEEE, 2004, pp. 310-314, use the most promising box. In other examples, similar boxes are averaged together.

B. Li, "3d fully convolutional network for vehicle detection in point cloud," in Intelligent Robots and Systems (IROS), 2017 IEEE/RSJ International Conference on. IEEE, 2017, pp. 1513-1518, and V. Vaquero, I. del Pino, F. Moreno-Noguer, J. Solà, A. Sanfeliu, and J. Andrade-Cetto, "Deconvolutional networks for point-cloud vehicle detection and tracking in driving scenarios," in Mobile Robots (ECMR), 2017 European Conference on. IEEE, 2017, pp. 1-7, describe modern approaches to lidar object detection which use convolutional neural networks, where the output of the network usually produces several hypotheses for a single object. Again, the most promising detections are usually extracted by applying a high enough threshold on the output of the neural network before applying temporal filtering. Important information about an object can be lost by ignoring potentially relevant hypotheses from such detection algorithms.

For radar sensors, the Doppler information provides a precise information about the motion state of the object, especially in cases where there are multiple radar detections under different azimuth angles. D. Kellner, M. Barjenbruch, J. Klappstein, J. Dickmann, and K. Dietmayer, "Tracking of extended objects with high-resolution doppler radar," IEEE Transactions on Intelligent Transportation Systems, vol. 17, no. 5, pp. 1341-1353, 2016, describe that the profile of the Doppler velocity over the azimuth angle improves the estimation of the motion state of an object significantly. Nevertheless, due to the micro-Doppler effect a robust approach is required to extract this velocity profile. Micro-Doppler detections are present if parts of the object move with a different velocity than the main body, e.g. wheels of vehicles or arms/legs of pedestrians. Multiple hypotheses of the velocity profile which include or exclude potential micro-Doppler could be used as measurement hypotheses, enabling temporal filtering to resolve the correct hypothesis related to the true motion of the object's main body.

In accordance with embodiments of the present invention, an extension of the Labeled Multi-Bernoulli Filter (LMB) is provided, which allows for the integration of multiple measurement hypotheses.

The Labeled Multi Bernoulli (LMB) filter is based on Random Finite Set statistics (RFS) to solve the multi target tracking problem. The filter jointly estimates the number of objects/trajectories present in the environment as well as the objects' states. The LMB is derived from the Generalized LMB (GLMB), which shows a tractable and mathematically principled RFS-based solution for the multi-target tracking problem. By reducing the number of possible update hypotheses in the filter's update step, the LMB is a computational efficient approximation of the GLMB.

B.-N. Vo, B.-T. Vo, and H. G. Hoang, "An efficient implementation of the generalized labeled multi-bernoulli filter," IEEE Transactions on Signal Processing, vol. 65, no. 8, pp. 1975-1987, 2017, introduce two modifications improving the computational efficiency: the integration of prediction and update into a single step (further called joint prediction and update) and an efficient algorithm for truncation of the update hypotheses using Gibbs sampling.

S. Reuter, A. Danzer, M. Staler, A. Scheel, and K. Granstrom, "A fast implementation of the labeled multi-bernoulli filter using gibbs sampling," in Intelligent Vehicles Symposium (IV), 2017 IEEE. IEEE, 2017, pp. 765-772, which is incorporated by reference in its entirety (referred to as "Reuter et al."), applies both modifications to the LMB, showing that it is possible to process dense urban scenarios with a large number of traffic participants in real-time. According to embodiments of the present invention, an extension of this algorithm is proposed for the handling of multiple measurement hypotheses and including them efficiently in the joint prediction and update step.

M. Beard, S. Reuter, K. Granstrom, B.-T. Vo, B.-N. Vo, and A. Scheel, "Multiple extended target tracking with labeled random finite sets," IEEE Transactions on Signal Processing, vol. 64, no. 7, pp. 1638-1653, 2016, describe a solution for tracking multiple extended objects using the GLMB filter is proposed by handling multiple partitions of measurements. In theory it could be transformed into a multiple measurement hypotheses problem, by building up partitions that covers all combinations of hypotheses of one measurement individually. But the complexity of the problem will increase significantly, since the partitions have to cover all combinations of hypotheses from all measurements. Even if there are only five measurements with five hypotheses each and the measurements can each be associated to a single object by a pre-gating step, $5^5=3125$ partitions must still be created. These partitions and additional clutter measurements have to be combined with all update hypotheses from survived and newly born objects, which is not feasible for real-time applications.

In accordance with embodiments of the present invention, in particular, an extension to the Labeled Multi-Bernoulli Filter (LMB) for handling multiple measurement hypotheses is provided, as they can occur with object detection using lidar, camera and radar. Real-time performance is achieved using an efficient Gibbs sampling, which directly handles multiple measurement hypotheses. The algorithm and its modifications are analyzed in detail using a simple example. Finally, two simulations show that the proposed algorithm is able to handle multiple measurement hypotheses better than the standard LMB filter. The performance increases even if these hypotheses have a significant systematic, non-Gaussian error.

One or more of the objects specified above are substantially achieved by methods and systems for integrating multiple measurement hypotheses in an efficient labeled multi-Bernoulli (LMB) filter in accordance with any one of the appended claims, which alleviate or eliminate one or more of the disadvantages described above and which realize one or more of the aforementioned advantages.

According to the invention, there is provided a method and system for integrating multiple measurement hypotheses in an efficient labeled multi-Bernoulli (LMB) filter, the LMB filter estimating a plurality of tracks for a plurality of objects, each track of the plurality of tracks having a unique label, a probability, and a state, wherein each track of the plurality of tracks is associated to an object of a plurality of objects to be tracked, each object having an object state, the method comprising: receiving one or more measurement hypotheses of the multiple measurement hypotheses for each object of the plurality of objects; updating each track of the plurality of tracks based on the respective track and the one or more measurement hypotheses of the multiple measurement hypotheses; determining, for each combination of track of the plurality of tracks and measurement hypothesis, a likelihood $\eta_i(j, k)$; sampling, for each iteration of a plurality of iterations, an update hypothesis $\gamma^{(t)}$, based on an association of each track of the plurality of tracks to one of: a measurement hypothesis, an events missed detection, or a track dying detection; determining the state of each track of the plurality of tracks based on its respective associations in the updated hypotheses $\gamma^{(t)}$; extracting, for each track of the plurality of tracks, an existence probability; predicting the object state of each object of the plurality of objects with respect to a next measurement time; determining, whether another update is to be performed; and if another update is to be performed, repeating again the method steps from and including updating each track of the plurality of tracks.

In a preferred embodiment, the sampling further includes: determining a weight $p_G$ of an updated hypothesis based on a likelihood of the contained associations and/or events; and erasing duplicate update hypotheses $\gamma$ out of the vector of hypotheses $\gamma^{(1 \ldots T)}$.

In a preferred embodiment, the sampling is configured to create a hypotheses vector containing the respective associations; and wherein determining the state of each track of the plurality of tracks is further based on the weight $p_G$ of the update hypotheses $\gamma$.

In a preferred embodiment, extracting for each track an existence probability is based on the weight $p_G$ of the update hypotheses $\gamma$, which confirms the respective track by either a measurement update or a missed detection.

In a preferred embodiment, on a first update, updating each track of the plurality of tracks is based on the respective track and all measurement hypotheses of the multiple measurement hypotheses.

In a preferred embodiment, the method further comprises pre-gating each track of the plurality of tracks in order to determine measurements relevant to the respective track and to update each track of the plurality of tracks based on relevant measurements only; optionally determining relevant measurements being based on a distance between the respective track of the plurality of tracks the respective and measurement, thereby discarding measurements exceeding a predetermined maximum distance.

In a preferred embodiment, determining each measurement hypothesis of the multiple measurement hypotheses is based on a Gaussian mixture $$Z_j = \sum_{k=1}^{K_j} w_j^k \mathcal{N}(z; z_j^k, R_j^k)$$

wherein $w_j^k$ is the probability of each hypothesis $k=1 \ldots K_j$ and $z_j^k$, $R_j^k$ is the measurement vector and measurement covariance of the hypothesis.

In a preferred embodiment, the method further comprises discarding one or more measurement hypotheses of the multiple measurement hypotheses based on position-based gating, optionally wherein the discarding is based on an association likelihood $g(z_j^k|x_i)$.

In a preferred embodiment, determining, for each track of the plurality of tracks, a likelihood $(\eta_i(j,k))$ is based on $$\eta_i(j, k) = \begin{cases} 1 - r_i, & \text{died} \quad \gamma_i = -1 \\ (1 - PD(x_i))r_i, & \text{missed} \quad \gamma_i = 0 \\ \dfrac{PD(x_i)g(z_j^k|x_i)}{\kappa(z_{(h,j)})} w_j^k r_i, & \text{updated} \quad \gamma_i = (k, j) \end{cases}$$

wherein $p_D(x_i)$ is a detection rate assumed to depend only on the track and K denotes the Poisson distributed spatial clutter intensity.

In a preferred embodiment, sampling, for each iteration t of a number of iterations T, an update hypothesis $\gamma^{(t)}$ is based on a Gibbs Sampling Algorithm.

In a preferred embodiment, the Gibbs Sampling Algorithm receives as input the number of iterations T, a likelihood table $\eta$, and a look-up table $\Lambda$ holding associated measurement hypotheses labels $(j_{1 \ldots L}, k_{1 \ldots L})$.

In a preferred embodiment, the likelihood table $\eta$ has a size P×(L+2) and is constructed based on $$\eta = \begin{bmatrix} \eta_1(-1) & \eta_1(1) & \eta_1(j_1, k_1) & \cdots & \eta_1(j_L, k_L) \\ \vdots & \vdots & \vdots & \ddots & \vdots \\ \eta_P(-1) & \eta_P(1) & \eta_P(j_1, k_1) & \cdots & \eta_P(j_L, k_L) \end{bmatrix}$$

wherein L denotes the most likely measurement hypotheses; optionally wherein L is chosen, such that at least all hypotheses of close-by measurements are included.

In a preferred embodiment, the look-up table $\Lambda$ is constructed based on $$\Lambda = \begin{bmatrix} -1 & 0 & (j_1, k_1)_1 & \cdots & (j_L, k_L)_1 \\ \vdots & \vdots & \vdots & \ddots & \vdots \\ -1 & 0 & (j_1, k_1)_P & \cdots & (j_L, k_L)_P \end{bmatrix}.$$

In a preferred embodiment, the method further comprises generating one or more measurement hypotheses of the multiple measurement hypotheses for each object of the plurality of objects; optionally wherein the one or more measurement hypotheses of the multiple measurement hypotheses are provided with equal weight or with different weights based on a measurement of one or more sensors.

In a preferred embodiment, the one or more sensors include one or more of: a radar sensor, an optical sensor, in particular a camera, an ultrasonic sensor, a lidar sensor; and/or the one or more measurement hypotheses include one or more extracted boxes out of images representing a single real world object; and/or the one or more measurement hypotheses include multiple boxes, ellipses, or similar other geometries representing a single real world object; and/or the one or more measurement hypotheses are based on a single radar measurement, where multiple Doppler velocity profiles of extended real world objects are generated.

In a preferred embodiment, sampling further comprises associating not more than a single measurement hypothesis of the multiple measurement hypotheses of a single object of the plurality of objects to a respective track of the plurality of tracks.

According to the invention there is further provided a system for integrating multiple measurement hypotheses in an efficient LMB filter, the system comprising a control unit configured for performing the method according to embodiments presented herein.

According to the invention there is further provided a vehicle comprising the system according to embodiments presented herein.

The accompanying drawings disclose exemplifying and non-limiting aspects in accordance with embodiments of the present invention.

DETAILED DESCRIPTION OF THE DRAWINGS

Figure 1:
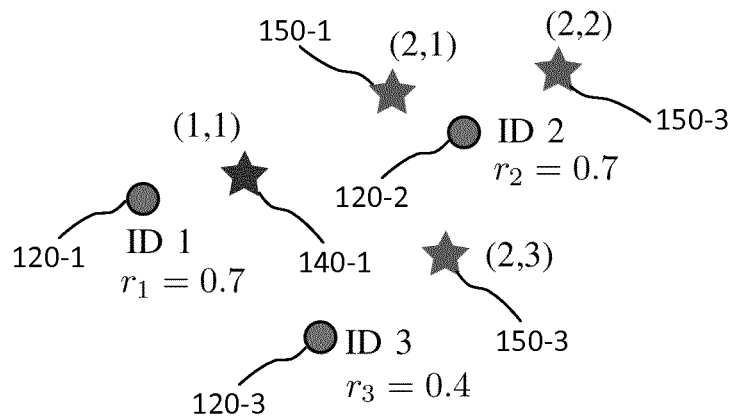
FIG. 1 shows an example configuration illustrating three objects and two measurements and corresponding hypotheses in accordance with embodiments of the present invention.

The LMB filter estimates a set of statistically independent tracks, which have a unique label (ID), an existence probability r and a state representation. According to embodiments of the present invention, the Gaussian Mixture implementation is chosen as the state, where each track is described by one Gaussian Mixture, having multiple mixture components each with a state vector, covariance and weight $w^c$. The weight over all mixture components for a single track sums up to one.

In accordance with embodiments of the present invention, multiple measurement hypotheses are considered, which merely pertains to the update step. Therefore this step is described in detail.

Multiple Measurement Hypothesis Definition

The multiple measurement hypotheses are defined by a set of measurement hypotheses originating from a single object j using a Gaussian mixture $$Z_j = \sum_{k=1}^{K_j} w_j^k \mathcal{N}(z; z_j^k, R_j^k) \quad (1)$$

where $w_j^k$ is the probability of each hypothesis $k=1 \ldots K_j$ and $z_j^k$, $R_j^k$ is the measurement vector and measurement covariance of a particular hypothesis. A single hypothesis, referring to a single component of a multiple measurement hypotheses Gaussian mixture, can be uniquely identified by the tuple (j,k). In general only one of the hypotheses is the best measurement for the object and it is unknown which of the measurement hypotheses it could be.

For a single measurement frame, the total received measurements can then be defined as $$Z = C \cup \left[\bigcup_{j=1}^{N_z} Z_j\right] \quad (2)$$

where $N_z$ is the number of objects generating measurement hypotheses and C are additional clutter measurement hypotheses. Traditionally, clustering or detection algorithms are used to generate such hypotheses sets for a single object, where a choice is made about the best measurement in such a set via some criteria, such as the highest score. According to embodiments of the present invention, a choice will not be explicitly made after the clustering of hypotheses, but instead all hypotheses for a measurement cluster $Z_j$ are given to the LMB filter, which will resolve to the best solution over time. The hypothesis probability $w_j^k$ will then directly represent the confidence in the hypotheses as resulting from such clustering or detection algorithms.

LMB Update

The input to the update step is a set of predicted tracks (a priori state) and new measurements Z. At the beginning of the update the existence probability of each track is multiplied by a surviving probability. The set is then extended with new tracks from the birth model, after which there are $i=1 \ldots P$ tracks with existence probabilities $r_i$. First, all tracks are updated by all measurement hypotheses. To increase performance a position-based gating is performed to save the computation time of very unlikely associations. An association is specified with $\gamma_i=(j,k)$ and refers to an association of track i with a measurement hypothesis (j,k). For each likely association the track is updated with the measurement hypothesis. Since multiple mixture components could be present in one track, each component is updated and its weight is adapted accordingly. The result is the a posteriori Gaussian mixture, which is stored and used at the end to build up the a posteriori track. During the update the likelihood of the association is calculated $g(z_j^k|x_i)$.

Additionally, the likelihoods for a dying track $\gamma_i=-1$ and missed detection $\gamma_i=0$ are calculated. The detection rate $p_D(x_i)$ is assumed to depend only on the track, where $\kappa$ denotes the Poisson distributed spatial clutter intensity:

$$\eta_i(j,k) = \begin{cases} 1-r_i, & \text{died} \quad \gamma_i = -1 \\ (1-p_D(x_i))r_i, & \text{missed} \quad \gamma_i = 0 \\ \frac{p_D(x_i)g(z_j^k \mid x_i)}{\kappa(z_{(k,j)})} w_j^k r_i, & \text{updated} \quad \gamma_i = (k,j) \end{cases} \quad (3)$$

A likelihood table $\eta$ with size $P\times(L+2)$ is constructed containing the likelihood for dying, missed detection and the L most likely measurement hypotheses:

$$\eta = \begin{bmatrix} \eta_1(-1) & \eta_1(1) & \eta_1(j_1,k_1) & \cdots & \eta_1(j_L,k_L) \\ \vdots & \vdots & \vdots & \ddots & \vdots \\ \eta_P(-1) & \eta_P(1) & \eta_P(j_1,k_1) & \cdots & \eta_P(j_L,k_L) \end{bmatrix} \quad (4)$$

where L should be chosen, such that at least all hypotheses of the close-by measurements are included. To retain the relation of the tracks to the measurements, a look-up table $\Lambda$ holding the associated measurement hypotheses labels $(j_{1\ldots L}, k_{1\ldots L})$ is constructed:

$$\Lambda = \begin{bmatrix} -1 & 0 & (j_1,k_1)_1 & \cdots & (j_L,k_L)_1 \\ \vdots & \vdots & \vdots & \ddots & \vdots \\ -1 & 0 & (j_1,k_1)_P & \cdots & (j_L,k_L)_P \end{bmatrix} \quad (5)$$

One combination t of associations for all tracks is called an update hypothesis and is denoted as a P-tuple with $\gamma^{(t)}=(\gamma_1, \ldots, \gamma_P)$. In one update hypothesis, each measurement j can only be associated to one track.

For each update hypothesis $\gamma^{(t)}$ the corresponding likelihood $w_G^{(t)}$ can be estimated by multiplying the likelihood of the included track associations:

$$w_G^{(t)} = \prod_{i=1\ldots P} \eta_i(\gamma_i^{(t)}) \quad (6)$$

It is intractable to consider all update hypotheses, since there are many combinations of tracks surviving, not being detected or updated by any measurement hypotheses. A tractable solution to generate the update hypotheses is Gibbs sampling.

Gibbs Sampling

The proposed Gibbs sampling is shown in Algorithm 1 (see below). For each Gibbs iteration t from $1 \ldots T$ an update hypothesis $\gamma^{(t)}$ is sampled. There is an array J holding the measurement ids j of currently associated measurements. For the extraction of the measurement label j from the measurement hypotheses (j,k) the following function is defined:

$$\lambda(\gamma_i) = \begin{cases} -1, & \gamma_i = -1 \quad \text{died} \\ 0, & \gamma_i = 0 \quad \text{missed detection} \\ j & \gamma_i = (j,k) \quad \text{updated by } (j,k) \end{cases} \quad (7)$$

In one Gibbs iteration, there is a loop over all tracks. For each track, first the associated measurement of the previous frame is released from J and second a new association is sampled. It is sampled from all available measurement hypotheses $((j,k) \forall j=[1 \ldots N_z], j \ni J)$ and the two other cases died or missed detection. After sampling T update hypotheses, all duplicates are erased and the remaining association likelihoods are normalized to 1, resulting in the update hypotheses probabilities $p_G$. The complexity of the Gibbs sampling is linear with the number of tracks. The two parameters L (maximum number of associations per object) and T (maximum Gibbs iterations) provide a trade-off between accuracy and speed.

In some embodiments, optionally, a Hungarian association is used as an initial update hypothesis $\gamma^{(1)}$. However, this is not required. Generally, it is assumed that all tracks die (j=-1) as an initial solution (see FIG. 2). An alternative option would be that all tracks have a missed detection, meaning they are still alive, but they haven't generated any measurement in the current frame.

Based on the example datasets, it is shown that this does not yield a significant improvement when using a sufficient number of Gibbs iterations. Hungarian association requires as input a cost matrix (see, e.g., Reuter et al.), which must additionally be calculated. Furthermore, the standard Hungarian algorithm is not able to differentiate between multiple measurement hypotheses, so that the solution could contain multiple hypotheses of one measurement j, which is undesired.

ALGORITHM 1

Modified Gibbs sampling
Input: T, $\eta$, $\Lambda$
Output: $\gamma^{(1)} \ldots \gamma^{(T)}$
and $p_G^{(1)} \ldots p_G^{(T)}$

```
1:    c := [1 : L + 2]
2:    J = [-1, . . . -1]
3:    η̃ = η
4:    for t = 1 : T do
5:        γ(t) = [ ]
6:        w_G(t) = 1.0
7:        for i = 1 : P do
8:            J [i] = -1
9:            for l = 3 : (L + 2) do
10:               if Λ(l) in J then
11:                   η̃_k(l) = 0
12:               else
13:                   η̃_k(l) = η_k(l)
14:               end if
15:           end for
16:           y_i(t) = Categorical(Λ_k(c), η̃_i)
17:           w_G(t) *= η_i(y_i(t))
18:           if λ(y_i(t)) > 0 then
19:               J [i] = λ(y_i(t))
20:           end if
21:       end for
22:   end for
23:   ClearDuplicates(γ,w_G)
24:   p_G = Normalize(w_G)
```

LMB Reconstruction

In order to close the recursion, the a posteriori LMB tracks are built up by approximating the multi-object posteriori density by an LMB density with parameters $\pi_{Z_+}(X)=\{r,p\}_{l_+} \in \mathbb{L}_+$ where (references (19), (20), and (21) referring to Reuter et al.)

$$r(\ell_+) = \sum_{(I_+, \theta_+) \in \mathcal{F}(\mathbb{L}_+) \times \Theta_+} \overline{w}_{Z_+}^{(I_+, \theta_+)} 1_{I_+}(\ell_+), \quad (19)$$

-continued $$p(x_+, \ell_+) = \frac{1}{r(\ell_+)} \sum_{\substack{(I_+, \theta_+) \\ \in \mathcal{F}(\mathbb{L}_+) \times \Theta_+}} \overline{w}_{Z_+}^{(I_+,\theta_+)} 1_{I_+}(\ell_+) p_{Z_+}^{(\theta_+)}(x_+, \ell_+), \quad (20)$$

$$\overline{w}_{Z_+}^{(I_+,\theta_+)} = \frac{w_{Z_+}^{(I_+,\theta_+)}}{\sum_{(I'_+,\theta'_+) \in \mathcal{F}(\mathbb{L}_+) \times \Theta_+} w_{Z_+}^{(I'_+,\theta'_+)}} \quad (21)$$

The approximation exactly matches the first moment of the posterior δ-GLMB distribution, i.e. the spatial distribution of the tracks as well as the mean value of the cardinality hypotheses that contradict the received measurement set (e.g. by modeling the disappearance of a track which obtains a precise measurement).

The multi-object posteriori density is equivalent to the update hypotheses with corresponding probability $p_G$. A single for-loop over all update hypotheses is sufficient. If for the first time an association $\gamma_i=(j,k)$ appears, the updated mixture components are included in the a posteriori track as mixture components and their weights $w_i^c(j,k)$ are multiplied by the update hypothesis probability $p_G$. The a posteriori Gaussian mixture has been stored at the beginning of this section when the update likelihood $g(z_j^k|x_i)$ was calculated. If the association $\gamma_i$ is already included, only the weights $w_i^c(j,k)$ of the corresponding mixture components are increased by the original components weight multiplied by $p_G$. The complexity of this transformation is linear with the number of tracks and the number of unique update hypotheses (at most T) and does not depend on the number of measurements.

Finally the existence probability of each track is calculated by summing-up the weights of its mixture components. Since the mixture weights are normalized to one before the update step, the existence probability of the track is equivalent to the sum of the probability of all update hypotheses $p_G$ the track was included in with j≥0:

$$r_i = \sum_t p_G^{(t)} \forall t \in 1 \ldots T, \lambda(\gamma_i^{(t)}) \geq 0 \quad (8)$$

The weights of the mixture components are equivalent to the sum of the probabilities of all update hypotheses this association is included in:

$$w_i^c(j,k) = \sum_t p_G^{(t)} \forall t \in 1 \ldots T, \gamma_i^{(t)} = (j,k) \quad (9)$$

and are normalized to one.

A further optimization could be to find subsets of measurements in combination with tracks e.g. using cluster techniques, where the update step can be assumed to be independent.

It has been shown, that the existence probability $r_i$ of an a posteriori track is constant when multiple measurement hypotheses are added. The existence probability directly depends on the update hypotheses probabilities $p_G^{(t)}$ in which the track is included. Therefore, it is sufficient to show that the un-normalized probability $(w_G^{(t)})$ is constant. To retain the existence probability, all measurement hypotheses have the same association likelihood $g(z_j|x_i)$. By including $K_j$ measurement hypotheses, a single update hypothesis $\gamma^{(t)}$ splits up to $K_j$ update hypotheses, which are summed up to determine the existence probability. In the following, the measurement to which track i=1 is associated to, is split up in $K_j$ measurement hypotheses:

$$w_G = \sum_{k=1}^{K_j} \eta_1(j,k) \prod_{i=2 \ldots P} \gamma_i \quad (10)$$

where the sum is equal to the likelihood without measurement hypotheses $\eta_1(j)$:

$$\sum_{k=1}^{K_j} \eta_1(j,k) \stackrel{(3)}{=} \frac{p_D(x_1)g(z_j|x_1)}{\kappa(z)} r_1 \sum_{k=1}^{K_j} w_j^k = \frac{p_D(x_1)g(z_j|x_1)}{\kappa(z)} r_1 = \eta_1(j) \quad (11)$$

Object Extraction

In most cases instead of the complete mixture a simplified output is provided per track, which contains only a single state and covariance. This can be achieved e.g. by calculating the weighted mean of all mixture components. The weight would be the component's weight $w_i^c$. Nevertheless, since multiple measurement hypotheses with systematic errors cause a multi-modal mixture distribution, it is advisable not to use the weighted mean value. The reason is, that if the systematic errors of the hypotheses are biased, the extracted state would be biased as well. Instead the mixture component with the highest weight should be extracted, so that the influence of wrong hypotheses is inhibited. Another option would be to extract all mixture components in close proximity with the highest common weight.

Example Scenario

FIG. 1 shows an example configuration illustrating three objects 120-1, 120-2, and 120-3 (ID1, ID2, and ID3) and two measurements 140, 150 and corresponding hypotheses in accordance with embodiments of the present invention.

The theoretical derivation of the last section is shown in a simple example in this section, which is shown in FIG. 1. In this scenario, there are three tracks and two measurements, whereas measurement j=2 consists of three hypotheses. The tracks are already predicted and their existence probabilities multiplied by the survival probability, such that only the update step is considered. For simplicity every track consists only of a single mixture component.

FIG. 1 shows an overview of the example configuration with three objects 120-1, 120-2, and 120-3 (ID1, ID2, and ID3) and two measurements (stars) with one hypothesis 140-1 for measurement 1 and three hypotheses 150-1, 150-2, and 150-3 for measurement 2.

In a first step all tracks are updated with all measurement hypotheses (see above "LMB Update"). The association likelihood $g(z_j^k|x_i)$ which considers the distance between predicted track and measurement and the covariance matrix, is given in Table I:

TABLE I

ASSUMPTION OF
ASSOCIATION LIKELIHOODS
$g(z_j^k|x_i)$

| (j, k)  | (1, 1) | (2, 1) | (2, 2) | (2, 3) |
|---------|--------|--------|--------|--------|
| track 1 | 1.0    | 0.2    | 0.1    | 0.2    |
| track 2 | 0.1    | 1.2    | 1.2    | 1.0    |
| track 3 | 0.5    | 0.1    | 0.05   | 1.5    |

Next, the likelihoods $\eta_i$ are calculated based on equation (3). To prepare the input for the Gibbs sampling (Algorithm 1), the likelihood table $\eta$ based on equation (4) and the corresponding mapping $\Lambda$ based on equation (5) are constructed (see Tables II and III).

TABLE II

LIKELIHOODS OF TRACK DIED,
PREDICTION AND L = 3 MOST
LIKELY ASSOCIATIONS $\eta$

| l           | -1   | 0    | 1    | 2    | 3    |
|-------------|------|------|------|------|------|
| track i = 1 | 0.30 | 0.07 | 0.63 | 0.04 | 0.04 |
| track i = 2 | 0.30 | 0.07 | 0.25 | 0.25 | 0.21 |
| track i = 3 | 0.60 | 0.04 | 0.18 | 0.18 | 0.01 |

TABLE III

ASSOCIATED MEASUREMENT
HYPOTHESES $\Lambda$ FOR ALL ENTRIES OF $\eta$

| l     | -1 | 0 | 1            | 2            | 3            |
|-------|----|---|--------------|--------------|--------------|
| i = 1 | -1 | 0 | 1 (λ(1, 1))  | 2 (λ(2, 1))  | 2 (λ(2, 3))  |
| i = 2 | -1 | 0 | 2 (λ(2, 1))  | 2 (λ(2, 2))  | 2 (λ(2, 3))  |
| i = 3 | -1 | 0 | 2 (λ(2, 3))  | 1 (λ(1, 1))  | 2 (λ(2, 1))  |

A constant detection probability $p_D$ of 0.9 and clutter rate $\kappa$ of 1 are assumed and L=3 is used. It is assumed that all hypotheses of measurement j=2 are equally weighted $$\left(w_2^k = \frac{1}{3}\right).$$

If the measurement hypotheses are treated independently $w_2^k=1$, the association likelihood of all combinations with (2, k) would increase by a factor of 3 in Table II. The measurement labels in $\Lambda$ (Table III) would be 1 to 4 (1 . . . 4,1). Update hypotheses like $\gamma=[(1,1), (2,1), (2,3)]$ would be possible. This solution is also evaluated in the following as Standard LMB.

After running the Gibbs Sampling (see above "Gibbs Sampling"), the weights of all update hypotheses are normalized to 1. The most likely update hypothesis is $\gamma^1=[(1,1), -1, -1]$ with probability $p_G=0.11$. The next three hypotheses change only in $\gamma_2^{2\cdots4}$, with the associated hypotheses (2,1), (2,2), (2,3) and probability 0.09, 0.09, 0.08. The next three hypotheses are dying track 1,3 and all hypotheses of measurement j=2 with track i=2 (probability 0.05, 0.05, 0.04).

Figure 2:
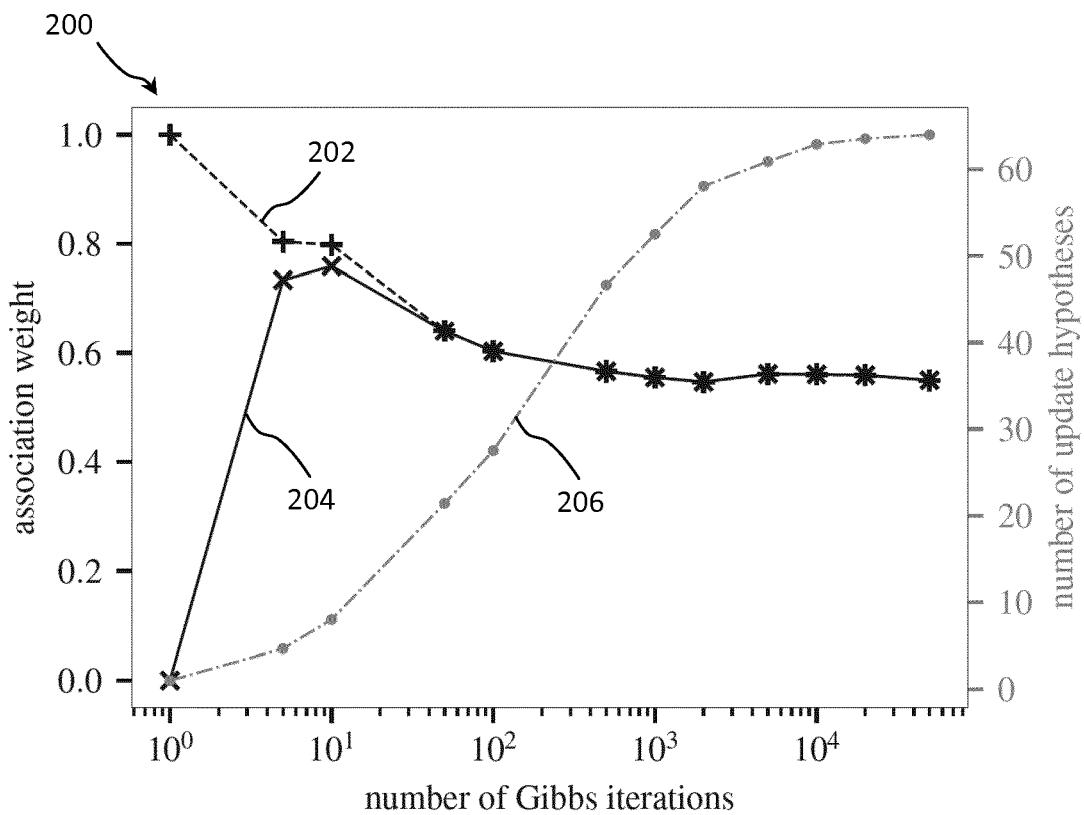
FIG. 2 shows a diagram illustrating how a number of update hypotheses and the weight of the most likely association of a first track depend on the number of Gibbs iterations Tin accordance with embodiments of the present invention.

FIG. 2 shows diagram 200 illustrating how the number of update hypotheses and the weight of the most likely association of the first track depend on the number of Gibbs iterations T. Diagram 200 shows results from a Monte Carlo simulation of a number of Gibbs iterations: influence on the weight of the most likely track-to-measurement association for the first track using Hungarian as initial solution (graph 202) and without (graph 204) and influence on the number of update hypotheses (graph 206). The number of update hypotheses is the extraction of unique hypotheses out of T hypotheses. The Hungarian solution as starting update hypothesis overestimates the weight, since the most likely association is always included, whereas starting with dying tracks (j=−1) yields an underestimation. But with more than 50 Gibbs iterations, both approaches show identical results. Since the weight converges with approximately 1000 iterations, the Hungarian initialization has no benefit in this example (see above).

The last step is the conversion of the update hypotheses to a posteriori tracks (see above "LMB Reconstruction"). The existence probability of the track r is calculated by summing up the probability of all update hypotheses $p_G$ in which the track is included based on equation (8), identified by the unique label. The result are shown in Table IV:

TABLE IV

EXISTENCE PROBABILITY
OF A POSTERIORI TRACKS

| track i=      | 1    | 2    | 3    |
|---------------|------|------|------|
| before        | 0.70 | 0.70 | 0.40 |
| Multi. Hyp. LMB | 0.67 | 0.66 | 0.27 |
| Standard LMB  | 0.75 | 0.87 | 0.55 |

For track 1 the existence probability is 0.67. It is mainly composed from the update hypothesis $\gamma_1=(1,1)$ ($p_G=0.58$) and missed detection hypothesis ($p_G=0.07$). Obviously the existence probability of track 3 decreases, since all measurements are in average closer to other tracks. Tracks 1 and 2 have a similar probability, slightly decreased due to the non-perfect measurements. Even though the sums of the likelihoods in Table I are identical for track 1 and 2, track 1 has a higher probability. The reason is, that track 3 has a higher likelihood with measurement 2, which is associated more likely with track 2.

When the measurement hypotheses are treated independently (Standard LMB), the existence probabilities of the tracks increase significantly, since more update hypotheses are feasible. Further, more measurements than tracks are available. Especially the combination of track 3 to (2,3) and track 2 to (2,1) or (2,2) is possible. The probability of track 3 increases significantly to 0.55 instead of decreasing.

The state of the a posteriori track is a Gaussian mixture, containing all feasible L track-to-measurement associations as mixture components. The weights of the components are calculated based on equation (9) and are shown in Table V:

TABLE V

WEIGHT OF THE MIXTURE COMPONENTS
$w_i^c(j, k)$ OF THE PREDICTED (0)
OR UPDATED TRACK
(BASED ON A MEASUREMENT (j, k))

| $w_i^c(\cdot)$ | 0    | (1, 1) | (2, 1) | (2, 2) | (2, 3) |
|----------------|------|--------|--------|--------|--------|
| track i = 1    | 0.11 | 0.85   | 0.02   | 0.0    | 0.02   |
| track i = 2    | 0.13 | 0.0    | 0.30   | 0.30   | 0.26   |
| track i = 3    | 0.19 | 0.33   | 0.19   | 0.0    | 0.28   |

One solution for a single output state would be to extract the mixture component with the highest weight. For track 1, this would be the mixture component from the association with measurement hypothesis (1,1). The components from the associations with (2,1) and (2,2) have the highest weight for track 2.

The cardinality distribution before and after the LMB update are shown in Table VI:

TABLE VI

| LMB CARDINALITY (EQUIVALENT TO GLMB CARDINALITY) | | | | | |
|---|---|---|---|---|---|
| cardinality | 0 | 1 | 2 | 3 | mean |
| before | 0.05 | 0.29 | 0.45 | 0.2 | 1.79 |
| Multi. Hyp. LMB | 0.06 | 0.35 | 0.54 | 0.06 | 1.59 |
| Standard LMB | 0.01 | 0.15 | 0.47 | 0.36 | 2.18 |

The probability of a cardinality of 1 or 2 is increased, whereas the cardinality of 0 and 3 is decreased. The average cardinality slightly decreases, since track 3 is not confirmed and the measurements for track 1 and 2 have a larger displacement.

If all hypotheses are treated as independent measurements, the average cardinality increases significantly to 2.18 and especially of a cardinality of 3 to 0.36.

Figure 3:
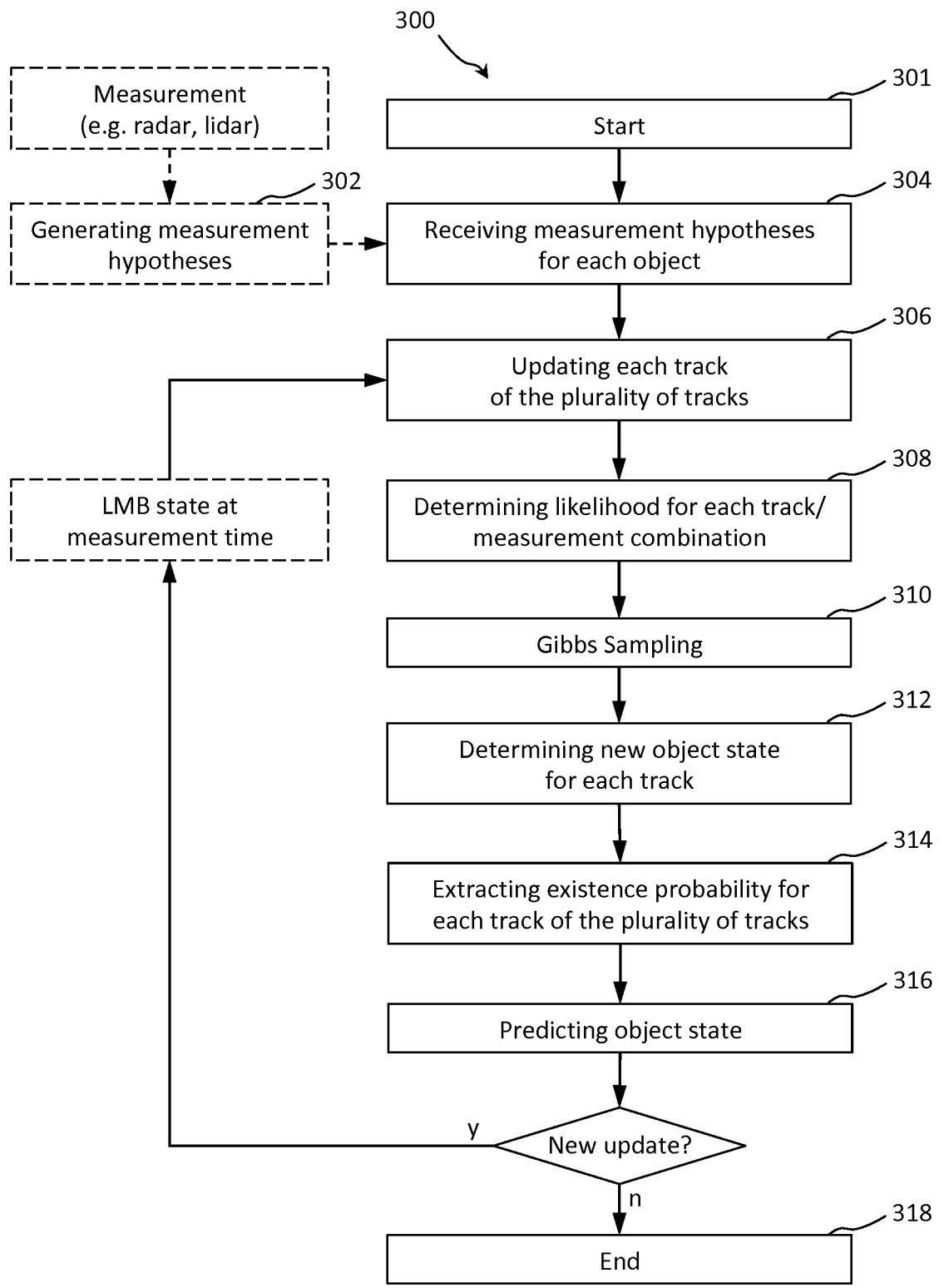
FIG. 3 shows a flow chart of an exemplary method for integrating multiple measurement hypotheses in accordance with embodiments of the present invention.

FIG. 3 shows a flow chart of an exemplary method 300 for integrating multiple measurement hypotheses in an efficient labeled multi-Bernoulli (LMB) filter in accordance with embodiments of the present invention. The LMB filter estimates a plurality of tracks i for a plurality of objects j. Each track i of the plurality of tracks has a unique label (ID), a probability r, and a state. Further, each track i of the plurality of tracks is associated to an object j of a plurality of objects to be tracked. Each object j has an object state. The method starts at step 301.

In step 304, one or more measurement hypotheses (j,k) of the multiple measurement hypotheses for each object j of the plurality of objects are received. Here, one or more measurement hypotheses (j, k) are received. Indeed, it can also happen that a sensor does not detect an object at all, so that no measurement hypothesis (j, k) is received at all. In general, it is assumed that at least one object j is detected.

In step 306, each track i of the plurality of tracks is updated based on the respective track i and the one or more measurement hypotheses (j, k) of the multiple measurement hypotheses. Indeed, on the first update only, all measurements are updated with all tracks. This may be required to calculate the measurement likelihood. In later iterations only reasonable measurement hypotheses (i.e. having a high likelihood) are processed by the LMB and unlikely measurement-track updates are withdrawn during the Gibbs sampling (see step 310). In further detail, only measurement-track updates, which have a high likelihood are used in the Gibbs sampling (see likelihood table η and look-up table Λ as described above). In an example, all measurement-tracks are performed and the likelihood is shown in Table I (see above). In this example, for the Gibbs sampling, only the three most-likely measurement-track updates are used (see Table III). For the first track, λ(2,2) is missing, meaning that it is very unlikely that track 1 is associated with measurement hypothesis (2,2). Consequently, the Gibbs sampling can "ignore" this update. In another practical example, if 100 tracks and 500 measurement hypothesis exist, it would be rather cumbersome to perform this update for all combinations, so that a pre-gating is performed (see above). For example, in autonomous driving usually only measurements which lie in a certain area (e.g. 5 m) around the track are considered. For all other measurements the likelihood may be set to infinity in order to disregard such measurements.

In step 308, for each combination of track (i) of the plurality of tracks and measurement ((j, k)), a likelihood $(\eta_t(j,k))$ is determined.

In step 310, for each iteration t of a plurality of iterations T, an update hypothesis $\gamma^{(t)}$ is sampled, based on an association of each track i of the plurality of tracks to one of: a measurement hypothesis (j, k), an events missed detection, or a track dying detection. It is noted, however, that for each measurement j, only a single hypotheses (j, k) is associated.

If, for example, measurement hypothesis (5,3) is associated to track 1, all other measurement hypotheses (5,1),(5, 2),(5, . . . ) of measurement 5 cannot be associated in this update hypothesis t to any other track i.

In step 312, the state of each track i of the plurality of tracks is determined based on its respective association associations in the updated hypotheses $\gamma^{(t)}$. In general, "object state" denotes the state of the object j (e.g. true velocity of vehicle) and the state of a track denotes the estimated state (e.g. estimated velocity). There are multiple ways to describe the track state if an object is updated with multiple hypotheses. According to embodiments of the present invention, a Gaussian mixture is used. This means that each feasible track-measurement update in y results in a Gauss component with a corresponding weight (see above).

In step 314, an existence probability is extracted for each track i.

In step 316, the object state of each object (j) of the plurality of objects is predicted with respect to a next measurement time. Typically, if the next measurement is received 100 ms later, all states are predicted to this time. For example, if the track has the x-position 10 m and velocity 5 m/s, the object state at the next measurement should be 10.5 m (100 ms*5 m/s), whereas the velocity stays constant. In some embodiments in accordance with the present invention, other models may be employed, for example assuming that the velocity changes and the acceleration is constant.

Subsequently it is determined, whether another update is to be performed. If another update is to be performed, the method steps are repeated again from and including the step 306 of updating each track i of the plurality of tracks. Otherwise, the method ends at step 318.

Optionally, the method 300 further comprises a step 302, in which one or more measurement hypotheses (j, k) of the multiple measurement hypotheses are generated for each object j of the plurality of objects. These generated one or more measurement hypotheses (j, k) are then received in step 304. Optionally, the one or more measurement hypotheses (j, k) of the multiple measurement hypotheses are provided with equal weight or with different weights based on a measurement of one or more sensors.

The invention claimed is:

1. A method for integrating multiple measurement hypotheses in an efficient labeled multi-Bernoulli (LMB) filter, the LMB filter estimating a plurality of tracks for a plurality of objects, each track (i) of the plurality of tracks having a unique label (ID), a probability (r), and a state, wherein each track (i) of the plurality of tracks is associated to an object (j) of a plurality of objects to be tracked, each object (j) having an object state, the method comprising:

receiving one or more measurement hypotheses ((j, k)) of the multiple measurement hypotheses for each object (j) of the plurality of objects;

updating each track (i) of the plurality of tracks based on the respective track (i) and the one or more measurement hypotheses ((j, k)) of the multiple measurement hypotheses;

determining, for each combination of track (i) of the plurality of tracks and measurement hypothesis ((j, k)), a likelihood ($\eta_i(j, k)$);

sampling, for each iteration (t) of a plurality of iterations (T), an update hypothesis $\gamma^{(t)}$, based on an association of each track (i) of the plurality of tracks to one of: a measurement hypothesis ((j, k)), an events missed detection, or a track dying detection;

determining the state of each track (i) of the plurality of tracks based on its respective associations in the update hypotheses ($\gamma$);

extracting, for each track (i) of the plurality of tracks, an existence probability;

predicting the object state of each object (j) of the plurality of objects with respect to a next measurement time;

determining, whether another update is to be performed; and if another update is to be performed, repeating again the method steps from and including updating each track (i) of the plurality of tracks.

2. The method of claim 1, wherein the sampling further comprises:

determining a weight ($p_G$) of an updated hypothesis based on a likelihood of the contained associations and/or events; and erasing duplicate update hypotheses ($\gamma$) out of the vector of hypothesis ($\gamma^{(1 \cdots T)}$).

3. The method of claim 2, wherein the sampling is configured to create a hypotheses vector ($\gamma^{(1 \cdots T)}$) containing the respective associations; and determining the state of each track (i) of the plurality of tracks is further based on the weight ($p_G$) of the update hypotheses ($\gamma$).

4. The method of claim 2, wherein extracting for each track (i) an existence probability is based on the weight ($p_G$) of the update hypotheses ($\gamma$), which confirms the respective track (i) by either a measurement update or a missed detection.

5. The method of claim 1, wherein, on a first update, updating each track (i) of the plurality of tracks is based on the respective track (i) and all measurement hypotheses ((j, k)) of the multiple measurement hypotheses.

6. The method of claim 1, further comprising:

pre-gating each track (i) of the plurality of tracks in order to determine measurements relevant to the respective track (i) and to update each track (i) of the plurality of tracks based on relevant measurements only;

optionally determining relevant measurements being based on a distance between the respective track (i) of the plurality of tracks the respective and measurement, thereby discarding measurements exceeding a predetermined maximum distance.

7. The method of claim 6, wherein determining each measurement hypothesis (k) of the multiple measurement hypotheses is based on a Gaussian mixture $$Z_j = \sum_{k=1}^{K_j} w_j^k \mathcal{N}(z; z_j^k, R_j^k)$$

wherein $w_j^k$ is the probability of each hypothesis k=1 ... $K_j$ and $z_j^k$, $R_j^k$ is the measurement vector and measurement covariance of the hypothesis.

8. The method of claim 7, further comprising:

discarding one or more measurement hypotheses ((j, k)) of the multiple measurement hypotheses based on position-based gating, optionally wherein the discarding is based on an association likelihood $g(z_j^k | x_i)$.

9. The method of claim 1, wherein determining, for each track (i) of the plurality of tracks, a likelihood ($\eta_i(j, k)$) is based on $$\eta_i(j, k) = \begin{cases} 1 - r_i, & \text{died} \quad \gamma_i = -1 \\ (1 - p_D(x_i))r_i, & \text{missed} \quad \gamma_i = 0 \\ \dfrac{p_D(x_i)g(z_j^k | x_i)}{\kappa(z_{(k,j)})} w_j^k r_i, & \text{updated} \quad \gamma_i = (k, j) \end{cases}$$

wherein $p_D(x_i)$ is a detection rate assumed to depend only on the track (i) and K denotes the Poisson distributed spatial clutter intensity.

10. The method of claim 1, wherein sampling, for each iteration t of a number of iterations T, an update hypothesis $\gamma^{(t)}$ is based on a Gibbs Sampling Algorithm.

11. The method of claim 10, wherein the Gibbs Sampling Algorithm receives as input the number of iterations T, a likelihood table $\eta$, and a look-up table $\Lambda$ holding associated measurement hypotheses labels ($j_{1 \ldots L}$, $k_{1 \ldots L}$).

12. The method of claim 11, wherein the likelihood table $\eta$ has a size P×(L+2) and is constructed based on $$\eta = \begin{bmatrix} \eta_1(-1) & \eta_1(1) & \eta_1(j_1, k_1) & \cdots & \eta_1(j_L, k_L) \\ \vdots & \vdots & \vdots & \ddots & \vdots \\ \eta_P(-1) & \eta_P(1) & \eta_P(j_1, k_1) & \cdots & \eta_P(j_L, k_L) \end{bmatrix}$$

wherein L denotes the most likely measurement hypotheses; optionally wherein L is chosen, such that at least all hypotheses of close-by measurements are included.

13. The method of claim 11, wherein the look-up table $\Lambda$ is constructed based on $$\Lambda = \begin{bmatrix} -1 & 0 & (j_1, k_1)_1 & \cdots & (j_L, k_L)_1 \\ \vdots & \vdots & \vdots & \ddots & \vdots \\ -1 & 0 & (j_1, k_1)_P & \cdots & (j_L, k_L)_P \end{bmatrix}.$$

14. The method of claim 1, further comprising:

generating one or more measurement hypotheses ((j, k)) of the multiple measurement hypotheses for each object (j) of the plurality of objects; optionally wherein the one or more measurement hypotheses ((j, k)) of the multiple measurement hypotheses are provided with equal weight or with different weights based on a measurement of one or more sensors.

15. The method of claim 14, wherein at least one of:

the one or more sensors include one or more of: a radar sensor, an optical sensor, in particular a camera, an ultrasonic sensor, a lidar sensor;

the one or more measurement hypotheses ((j, k)) include one or more extracted boxes out of images representing a single real world object;

the one or more measurement hypotheses ((j, k)) include multiple boxes, ellipses, or similar other geometries representing a single real world object; and the one or more measurement hypotheses ((j, k)) are based on a single radar measurement, where multiple Doppler velocity profiles of extended real world objects are generated.

16. The method of claim 1, wherein sampling further comprises associating not more than a single measurement hypothesis ((j, k)) of the multiple measurement hypotheses of a single object (j) of the plurality of objects to a respective track (i) of the plurality of tracks.

17. A system for integrating multiple measurement hypotheses in an efficient labeled multi-Bernoulli (LMB) filter, the system comprising:
a control unit configured to:
receive one or more measurement hypotheses ((j, k)) of the multiple measurement hypotheses for each object (j) of the plurality of objects;
update each track (i) of the plurality of tracks based on the respective track (i) and the one or more measurement hypotheses ((j, k)) of the multiple measurement hypotheses;
determine, for each combination of track (i) of the plurality of tracks and measurement hypothesis ((j, k)), a likelihood ($\eta_i(j, k)$);
sample, for each iteration (t) of a plurality of iterations (T), an update hypothesis $\gamma^{(t)}$, based on an association of each track (i) of the plurality of tracks to one of: a measurement hypothesis ((j, k)), an events missed detection, or a track dying detection;
determine the state of each track (i) of the plurality of tracks based on its respective associations in the update hypotheses ($\gamma$);
extract, for each track (i) of the plurality of tracks, an existence probability;
predict the object state of each object (j) of the plurality of objects with respect to a next measurement time;
determine, whether another update is to be performed; and
if another update is to be performed, repeat again the method steps from and including updating each track (i) of the plurality of tracks.

18. A vehicle comprising the system according to claim 17.

* * * * *